April 17, 1928.
A. T. PETERSON
1,666,349
VEHICLE BRAKING MECHANISM
Filed Dec. 31, 1926
2 Sheets-Sheet 1
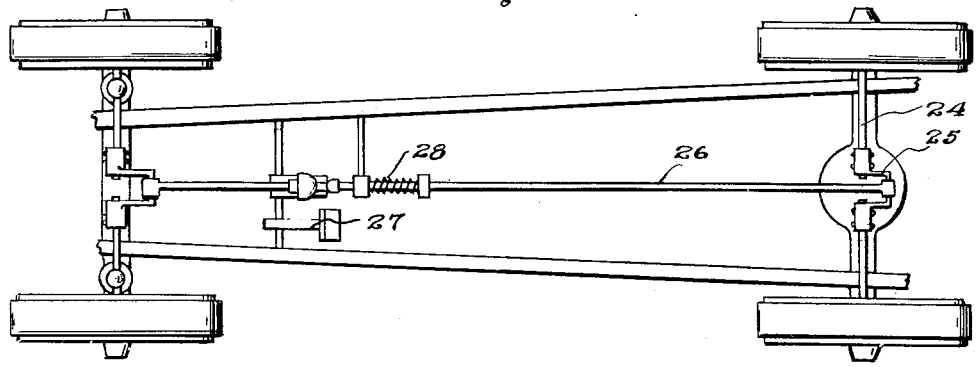
Fig. 1.
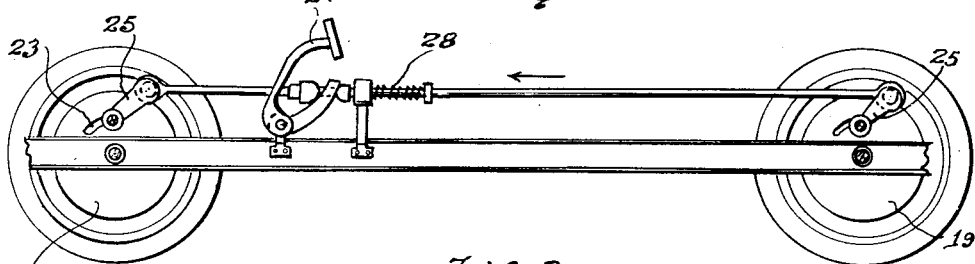
Fig. 2.
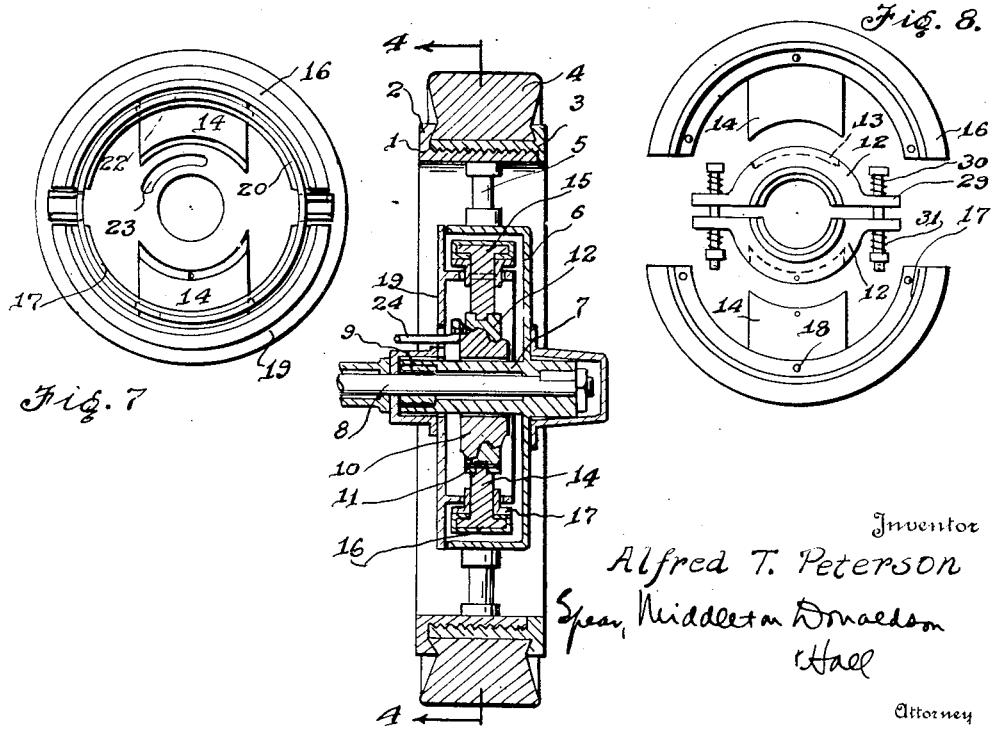
Fig. 3.
Fig. 7.
Fig. 8.
Inventor
Alfred T. Peterson
Spear, Middleton Donaldson
& Hall
Attorney April 17, 1928.

A. T. PETERSON 1,666,349

VEHICLE BRAKING MECHANISM

Filed Dec. 31, 1926

Inventor
Alfred T. Peterson

By Spear, Middleton, Donaldson & Hall

Attorney

Patented Apr. 17, 1928.

1,666,349

UNITED STATES PATENT OFFICE.

ALFRED T. PETERSON, OF CROOKED RIVERS, SASKATCHEWAN, CANADA.

VEHICLE BRAKING MECHANISM.

Application filed December 31, 1926. Serial No. 158,318.

My present invention relates to a braking device for vehicles being more particularly adapted for use on automobiles, although not limited thereto.

The principal objects of the invention are to provide a device of the type described which will be positive in its action, which will require a minimum amount of effort to apply, which will have few moving parts and which will be efficient in operation.

Other objects and advantages will appear as the description proceeds.

To this end the invention includes a vehicle wheel preferably of the rubber tired type having a brake drum surrounding the axle thereof. Upon this axle there is mounted a brake actuating element comprising a substantially frusto-conical member rotatable on said axle, the exterior periphery thereof including coarse threads. Upon this actuating element is mounted an intermediate member similarly threaded interiorly, and provided with an exterior peripheral groove adapted to receive the web of an arc shaped brake shoe. The shoe surface engages the inner periphery of the brake drum when the actuating member is rotated as by means of a foot lever or the like.

The invention further consists of the novel arrangements, combination and construction of parts hereinafter shown and described.

In the drawings:

Fig. 1 is a diagrammatic plan view showing the operating mechanism and connections in a brake constructed according to my invention.

Fig. 2 is a side elevation of Fig. 1.

Fig. 3 is a sectional elevation of a vehicle wheel constructed according to my invention.

Fig. 7 is a detail of the inside wheel plate.

Fig. 8 is an unassembled detail of the brake shoes and intermediate ring elements.

Figure 4:
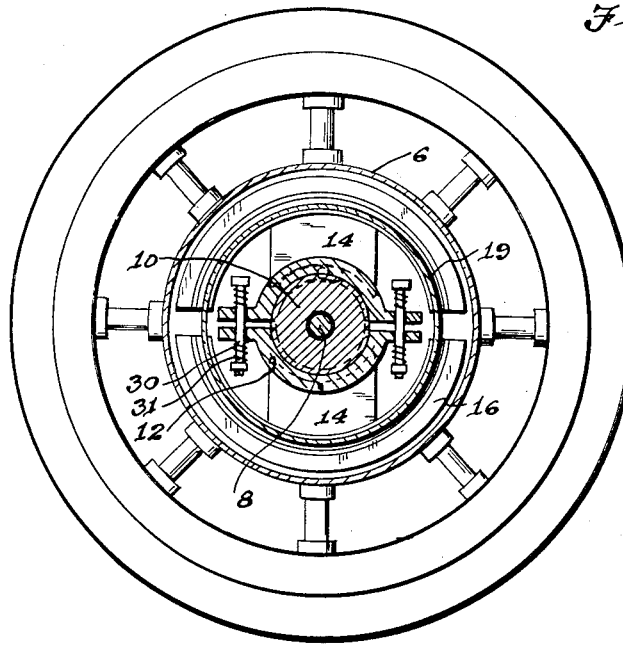
Fig. 4 is a sectional view along the line 4—4 of Fig. 3.
Figure 5:
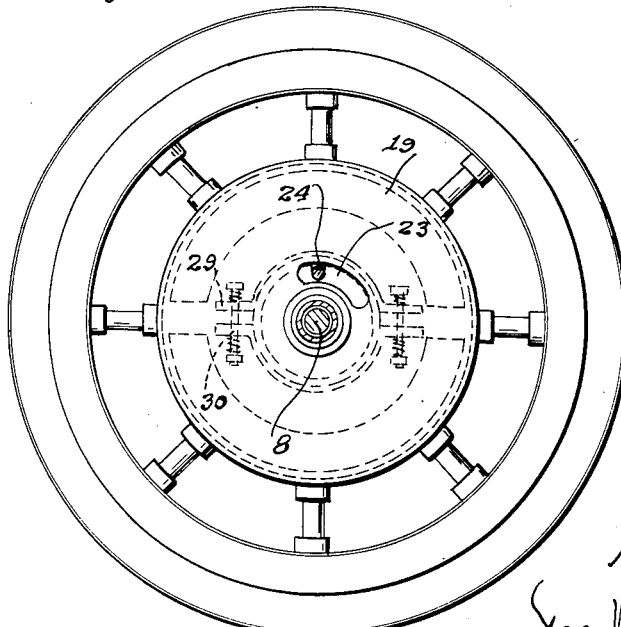
Fig. 5 is an assembly in side view of a left hand wheel.
Figure 6:
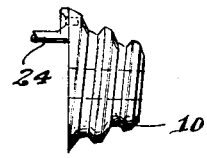
Fig. 6 is a detail of the brake actuating member.

Referring to the embodiment illustrated, I have shown at 1 a wheel rim having an upstanding rear flange 2. The rim 1 is threaded to receive the similarly threaded interior of the tire rim 3 to which is attached a rubber tire 4. As shown, the tire rim may be screwed on or off the wheel rim when it is desired to place or remove the tire. This makes unnecessary the provision of the usual lugs, bolts, etc. to secure the tire in place.

The wheel rim 1 is provided with spokes 5 connecting said rim with the brake drum 6. As shown this may be a casting to include an axle or hub 7 having an axial aperture therethrough to receive the vehicle axle 8. The rear portion of the wheel axle 7 is provided with a cavity to receive the usual bearing 9.

Mounted for rotation upon the wheel axle 7 I provide a brake actuating mechanism comprising a substantially frusto-conical member 10 having on its frusto-conical surface coarse threads 11. Upon this threaded surface is located intermediate split half rings 2 similarly threaded interiorly. These split half rings are provided with sockets 13 on its periphery to receive the web 14 of the brake shoe 15. A pin is provided passing through the lower web 14 to prevent dropping of this part from the member 12. An asbestos or similar covering 16 is folded over the shoe 15 and L irons 17 bolted or riveted together as by members 18 hold this frictional covering on the shoe.

Obviously as the actuating member 10 is rotated the intermediate parts 12 are caused to separate and the shoes are forced against the inside of the brake drum 6 thus bringing the vehicle to a stop.

In order to steady or prevent vibration of the shoes within the drum, I provide a back plate 19 secured in any desired stationary manner to the vehicle, and this plate is furnished with outwardly projecting flanges 20 having angular ends 21 to receive the ends of the brake shoes when not engaging the brake drum. Slots 22 enable the web 14 of the shoes to pass through the flange 20 and engage the intermediate split rings 12.

A curved slot 23 allows an arm 24 attached to the actuating member 10 to project through the plate 19, which arm is secured to a crank 25. A connecting rod 26 actuates this brake mechanism through a foot pedal or lever 27 pivoted in the usual manner. A spring 28 ensures return of the parts to their disengaged position when pressure on the foot pedal is released.

Duplicate parts may be provided to all four wheels of a vehicle where desired.

The ends 29 of the split rings 12 are apertured to receive bolts 30 encircled by springs 31 so that upon backward rotation of the actuating cone 10 under action of the spring 28, these parts 12 will likewise be brought together by the springs 31 so that the shoes 15 will no longer be pressed outwardly.

I claim:

1. In a brake mechanism, an axle, a frusto-conical element rotatable thereon, a brake drum, a brake shoe engageable therewith, means to rotate said frusto-conical element, whereby the brake shoe is moved axially and radially to engage the drum.

2. In a brake mechanism, an axle, a frusto-conical element rotatable thereon, a brake drum, a brake shoe engageable therewith, means to rotate said frusto-conical element, whereby the brake shoe is moved axially and radially to engage the drum, said frusto-conical element having coarse threads on its periphery.

3. In a brake mechanism, an axle, a frusto-conical element rotatable thereon, a brake drum, a brake shoe engageable therewith, means to rotate said frusto-conical element, whereby the brake shoe is moved radially to engage the drum, and an intermediate member between the frusto-conical element and the brake shoe imparting this movement to the latter.

4. In a brake mechanism, an axle, a frusto-conical element rotatable thereon, a brake drum, a brake shoe engageable therewith, means to rotate said frusto-conical element, whereby the brake shoe is moved radially to engage the drum, and an intermediate member between the frusto-conical element and the brake shoe imparting this movement to the latter, said intermediate member being threaded to the frusto-conical member.

5. In combination, a brake drum, a wheel axle carried thereby, a threaded frusto-conical actuating member rotatably carried by said axle, intermediate half rings threaded to said frusto-conical member, a brake shoe engageable with the brake drum, a web on said shoe engaging a half ring and means to prevent rotatable movement of said shoe.

6. In combination, a brake drum, a wheel axle carried thereby, a threaded frusto-conical actuating member rotatably carried by said axle, intermediate half rings threaded to said frusto-conical member, a brake shoe engageable with the brake drum, a web on said shoe engaging a half ring and means to prevent rotatable movement of said shoe, comprising a back plate closing said brake drum, an outstanding flange on said plate, the brake shoe web projecting through said flange.

7. In combination, a brake drum, a wheel axle carried thereby, a threaded frusto-conical actuating member rotatably carried by said axle, intermediate half rings threaded to said frusto-conical member, a brake shoe engageable with the brake drum, a web on said shoe engaging a half ring and means to prevent rotatable movement of said shoe, comprising a back plate closing said brake drum, an outstanding flange on said plate, the brake shoe web projecting through said flange, the ends of said flange being turned out angularly to receive the ends of the brake shoe.

8. In combination, a brake drum, a wheel axle carried thereby, a threaded frusto-conical actuating member rotatably carried by said axle, intermediate half rings threaded to said frusto-conical member, a brake shoe engageable with the brake drum, a web on said shoe engaging a half ring and means to prevent rotatable movement of said shoe, the ends of said half rings being loosely secured together and spring pressed together.

9. In combination, a brake drum, a wheel axle carried thereby, a threaded frusto-conical actuating member rotatably carried by said axle, intermediate half rings threaded to said frusto-conical member, a brake shoe engageable with the brake drum, a web on said shoe engaging a half ring and means to prevent rotatable movement of said shoe, each of said half rings having a peripheral socket to receive the web of the brake shoe.

In testimony whereof, I affix my signature.

ALFRED T. PETERSON.